June 5, 1923.

F. KESSEL

FISHHOOK

Filed Oct. 26, 1921

1,457,373

Patented June 5, 1923.

1,457,373

UNITED STATES PATENT OFFICE.

FRITZ KESSEL, OF NEW YORK, N. Y.

FISHHOOK.

Application filed October 26, 1921. Serial No. 510,543.

*To all whom it may concern:*

Be it known that I, FRITZ KESSEL, a citizen of the United States, and a resident of the city of New York, in the county of New York and State of New York, have invented certain new and useful Improvements in Fishhooks, of which the following is a specification.

The present invention relates to improvements in fish-hooks, and has for its main object to provide a weed-guard therefor, that is to say an attachment which prevents the hook from becoming entangled in weeds either at the bottom or at any other part of the body of water, in which the hook is to be employed for fishing purposes.

Another object of the invention is to produce a hook of the type mentioned which is simple in construction, efficient in operation and capable of manufacture on a commercial scale, or in other words one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1:
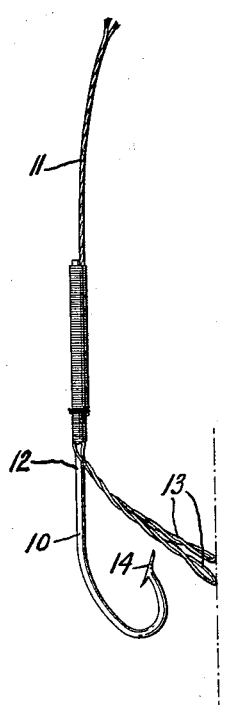
Figure 2:
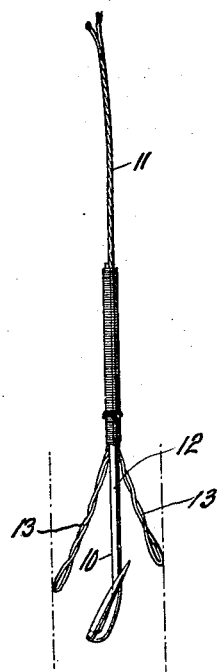

Figure 1 is a side elevation of a fish-hook provided with a weed-guard constructed in accordance with the present invention; and Fig. 2 is a front elevation thereof.

In the drawings, the numeral 10 indicates a fish-hook of any suitable construction, attached in any preferred manner to a snell 11. To the upper end of the shank 12 of the hook are attached in any suitable manner two spring-arms 13, preferably, made of wire, said arms being disposed in a plane that intersects the said shank at an acute angle and passes a substantial distance over barb 14 of the hook. The spring arms diverge from the shank 12 and extend a substantial distance beyond the barb of the hook, as clearly shown in Fig. 1 of the drawings. Each of the arms may be made of a wire piece that is bent back at its middle portion upon itself and suitably twisted, so as to lend it the required rigidity, although this is not essential.

The operation of this device is as follows: The bait is placed upon the hook in the usual manner, the spring arms not interfering with the baiting operation by reason of the fact that they project sidewards from the shank, as clearly shown in Fig. 2 of the drawings and permit thus the bait to be placed upon the hook conveniently. When the hook is thrown into a body of water containing weeds, it may be drawn back and forth between the weeds without the latter becoming entangled in the hook, as the spring arms prevent contact between the barb of the hook and the weeds.

It will be seen that the invention consists of a fishhook comprising a barbed hook shank and a weed guard yieldingly supported by the barbed shank and extending to either side of the barb of the hook and at a substantial distance over the barb of the hook and beyond the same.

What I claim is:—

The combination with a fish hook, having a shank and a barb, a pair of spring arms attached to the upper portion of the shank and disposed in a plane which intersects the shank at an acute angle and passes a substantial distance over the barb of the hook, said arms diverging from the shank and extending a substantial distance beyond said barb, said arms each comprising a length of relative thin spring wire bent back at its middle portion upon itself and being twisted from end to end of the arm for imparting the required thickness and rigidity to the arm and the twists being sufficiently close to permit the required flexing of the arm from end to end when subjected to impact and pressure.

Signed at New York, in the county of New York and State of New York, this 25th day of October, A. D. 1921.

FRITZ KESSEL.